(12) United States Patent
Hintermeister

(10) Patent No.: US 8,866,771 B2
(45) Date of Patent: Oct. 21, 2014

(54) MULTI-TOUCH MULTI-USER GESTURES ON A MULTI-TOUCH DISPLAY

(75) Inventor: Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/449,941

(22) Filed: Apr. 18, 2012

(65) Prior Publication Data

US 2013/0278507 A1    Oct. 24, 2013

(51) Int. Cl.
*G06F 3/041*    (2006.01)

(52) U.S. Cl.
USPC ............ 345/173; 345/156; 345/174; 715/863

(58) Field of Classification Search
CPC .............. G06F 3/04883; G06F 2203/04808; G06F 3/0488; G06F 3/017; A63F 2300/8088
USPC .......... 345/156, 173, 174, 175; 715/863, 753, 715/759, 754, 733, 750, 751
See application file for complete search history.

(56) References Cited

U.S. PATENT DOCUMENTS

| | | | |
|---|---|---|---|
| 7,532,196 B2 * | 5/2009 | Hinckley ...................... | 345/156 |
| 7,598,942 B2 | 10/2009 | Underkoffler et al. | |
| 7,725,547 B2 | 5/2010 | Albertson et al. | |
| 7,907,125 B2 | 3/2011 | Weiss et al. | |
| 2005/0183035 A1 * | 8/2005 | Ringel et al. .................. | 715/811 |
| 2006/0001650 A1 * | 1/2006 | Robbins et al. ............... | 345/173 |
| 2007/0257891 A1 * | 11/2007 | Esenther et al. .............. | 345/173 |
| 2008/0114844 A1 * | 5/2008 | Sanchez et al. ............... | 709/206 |
| 2008/0165132 A1 * | 7/2008 | Weiss et al. ................... | 345/173 |
| 2009/0094515 A1 * | 4/2009 | Do et al. ....................... | 715/273 |
| 2009/0259967 A1 * | 10/2009 | Davidson et al. ............. | 715/799 |
| 2010/0020025 A1 | 1/2010 | Lemort et al. | |
| 2010/0207874 A1 | 8/2010 | Yuxin et al. | |
| 2010/0281440 A1 | 11/2010 | Underkoffler et al. | |
| 2011/0055729 A1 | 3/2011 | Mason et al. | |
| 2011/0055773 A1 | 3/2011 | Agarawala et al. | |
| 2011/0090155 A1 | 4/2011 | Caskey et al. | |
| 2011/0102464 A1 | 5/2011 | Godavari | |
| 2011/0134047 A1 * | 6/2011 | Wigdor et al. ................ | 345/173 |

OTHER PUBLICATIONS

IBM et al.; "Hand Identification, Tracking and Gesture Detection for Multi-Person Displays", IPCOM000185994D, Aug. 4, 2009.
IBM et al.; "Telephony and Conference Facilitation in a Multi-Touch Interactive Environment", IPCOM000165498D, Dec. 17, 2007.
Mu et al.; "Implementation of the Interactive Gestures . . . On a Multi-User Virtual Learning Environment", ITCS International Conference on, Jul. 25-26, 2009, pp. 613-617.
Bimbo et al.; "Multi-user Natural Interaction System Based on Real-Time Hand Tracking and Gesture Recognition", ICPR Inter. Conf. on, vol. 3, Sep. 18, 2006, pp. 55-58.

* cited by examiner

*Primary Examiner* — Koosha Sharifi-Tafreshi
(74) *Attorney, Agent, or Firm* — Martin & Associates, LLC; Bret J. Petersen

(57) ABSTRACT

A multi-touch, multi-user gesture (MMG) controller aggregates gestures from multiple users of a large multi-touch display to allow the multiple users to perform a coordinated action on the multi-touch display. The MMG controller allows one or more users to initiate a multi-touch, multi-user gesture (MMG) session and determines the users that will participate in the MMG session. The MMG controller then aggregates input gestures from multiple users into a MMG to coordinate the effort of multiple users of a multi-touch, multi-user display or touch screen. Applications on a supported computer can use these MMGs to act upon elements on the display such as cropping or adding elements to a group.

17 Claims, 8 Drawing Sheets

MULTI-TOUCH MULTI-USER GESTURES ON A MULTI-TOUCH DISPLAY

BACKGROUND

1. Technical Field

This disclosure generally relates to computer devices with a multi-touch display, and more specifically relates to a method and apparatus for supporting multiple users to coordinate actions on a large multi-touch display with multi-touch, multi-user gestures (MMG).

2. Background Art

Computer systems employ a variety of input devices. Touch screens or touch displays are very common and used in a large variety of applications and systems. Touch screens have evolved to use many different types of input detection and now support multi-touch. Multi-touch means the touch sensing surface of a display or touch screen can recognize and track two or more points of contact or points of input. Multi-touch displays are now available in very large sizes such that multiple users can easily work on the touch display at the same time. However, there is currently no way to coordinate the actions of multiple users on a touch display to accomplish a desired task. With multiple users using the display, the multi-touch display needs a way to coordinate multi-touch input from the multiple users. As used herein, the term multi-touch display may include a virtual touch display where there is no physical touch. Such virtual touch displays may use camera images or other means to detect a touch input.

BRIEF SUMMARY

A multi-touch, multi-user gesture (MMG) controller aggregates gestures from multiple users of a large multi-touch display to allow the multiple users to perform a coordinated action on the multi-touch display. The MMG controller allows one or more users to initiate a multi-touch, multi-user gesture session and determines the users that will participate in the MMG session. The MMG controller then aggregates input gestures from multiple users into a MMG to coordinate the effort of multiple users of a multi-touch, multi-user display or touch screen. Applications on a supported computer can use these MMGs to act upon elements on the display such as cropping or adding elements to a group.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a multi-touch, multi-user gesture controller that aggregates gestures from multiple users of a large multi-touch display to allow the multiple users to perform a coordinated action on the multi-touch display. The MMG controller allows one or more users to initiate a multi-touch, multi-user gesture (MMG) session and determines the users that will participate in the MMG session. The MMG controller then aggregates input gestures from multiple users into a MMG to coordinate the effort of multiple users of a multi-touch, multi-user display or touch screen. Applications on a supported computer can use these MMGs to act upon elements on the display such as cropping or adding elements to a group.

Figure 1:
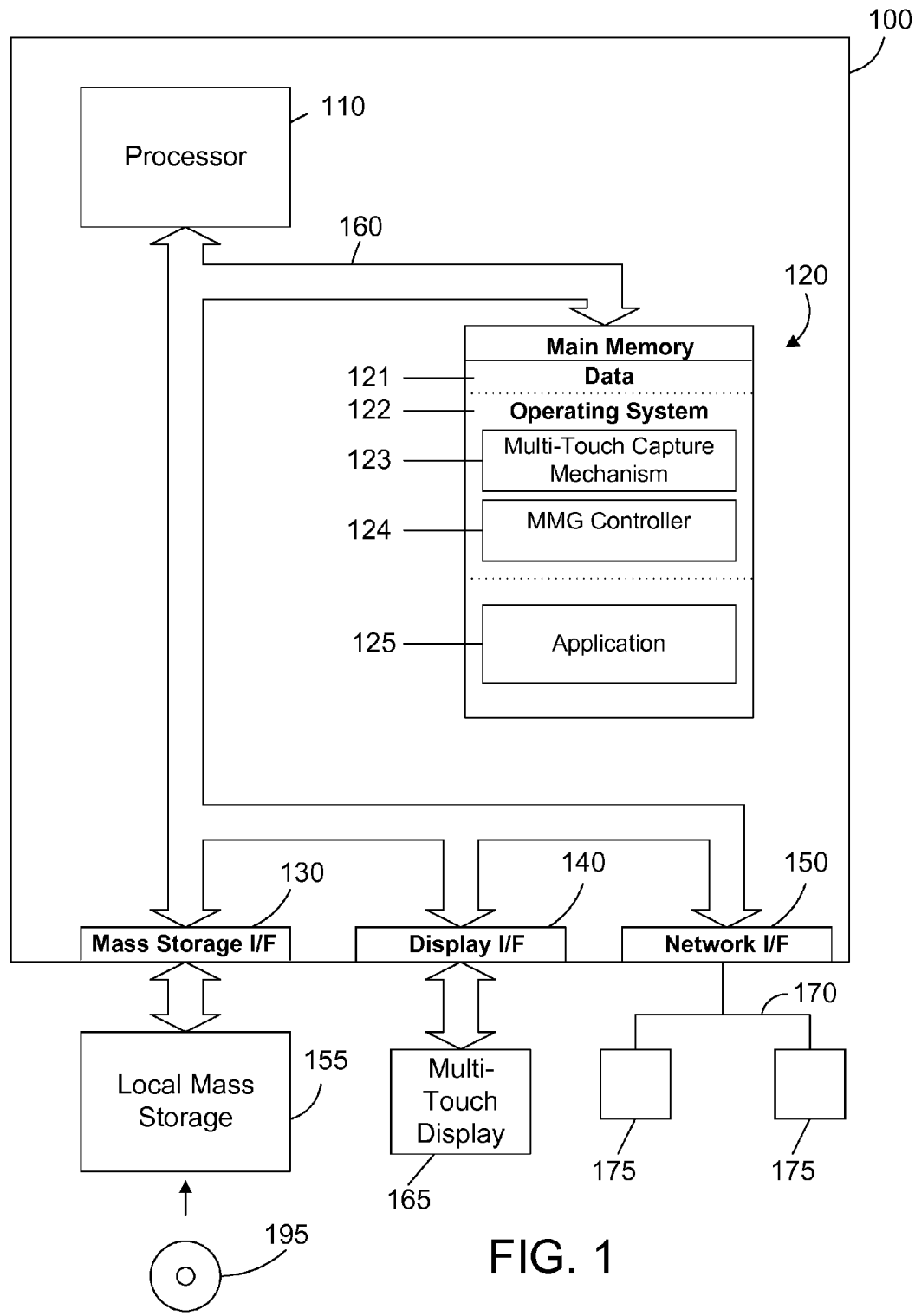
FIG. 1 is a block diagram of an apparatus that includes a multi-touch, multi-user gesture (MMG) controller that aggregates and coordinates gestures from multiple users of a large multi-touch display.

Referring to FIG. 1, a computer system 100 is one suitable implementation of a computer system that includes a MMG controller as described herein. Computer system 100 is an IBM eServer System x computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, a multi-touch capture mechanism 123, a multi-touch, multi-user gesture (MMG) controller 124, and an application 125. Data 121 represents any data that serves as input to or output from any program in computer system 100. Operating system 122 is a multitasking operating system. The multi-touch capture mechanism 123 and the multi-touch, multi-user gesture (MMG) controller 124 are shown as part of the operating system 122 but all or portions of these components may be firmware or hardware associated with the multi-touch display 165. The application 125 is a user program that incorporates coordinated, multi-touch, multi-user gestures supported by the MMG controller 124.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, multi-touch capture mechanism 123, multi-touch, multi-user gesture (MMG) controller 124, and the application 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes multi-touch capture mechanism 123, the multi-touch, multi-user gesture (MMG) controller 124, and the application 125.

Although computer system 100 is shown to contain only a single processor and a single system bus, those skilled in the art will appreciate that a multi-touch, multi-user gesture (MMG) controller 124 may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more multi-touch displays 165 to computer system 100. Other displays may also be used to provide system administrators and users the ability to communicate with computer system 100. Note, however, that while display interface 140 is provided to support communication with one or more multi-touch displays 165, computer system 100 does not necessarily require a multi-touch display 165 directly connected to the computer system 100, because all needed interaction with users and other processes may occur via network interface 150 to a remote multi-touch display. The multi-touch display 165 is preferably a very large display that allows multiple users to interact with the computer system 100 simultaneously. Further, the multi-touch display 165 in conjunction with the multi-touch capture mechanism 123 is able to detect and track gestures on the display in a manner known in the prior art. The multi-touch capture mechanism 123 then forwards this information to the MMG controller 124 to allow the users to participate together in a multi-touch, multi-user gesture (MMG) as described further below.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Figure 2:
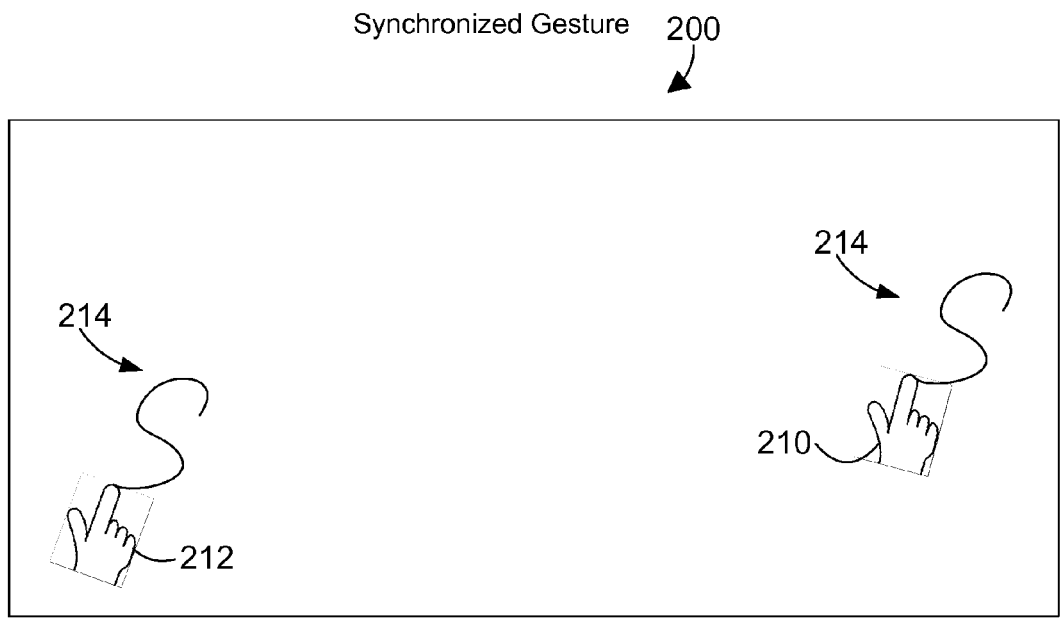
FIG. 2 illustrates a multi-touch display with two users initiating a MMG session using a synchronized gesture.
Figure 3A:
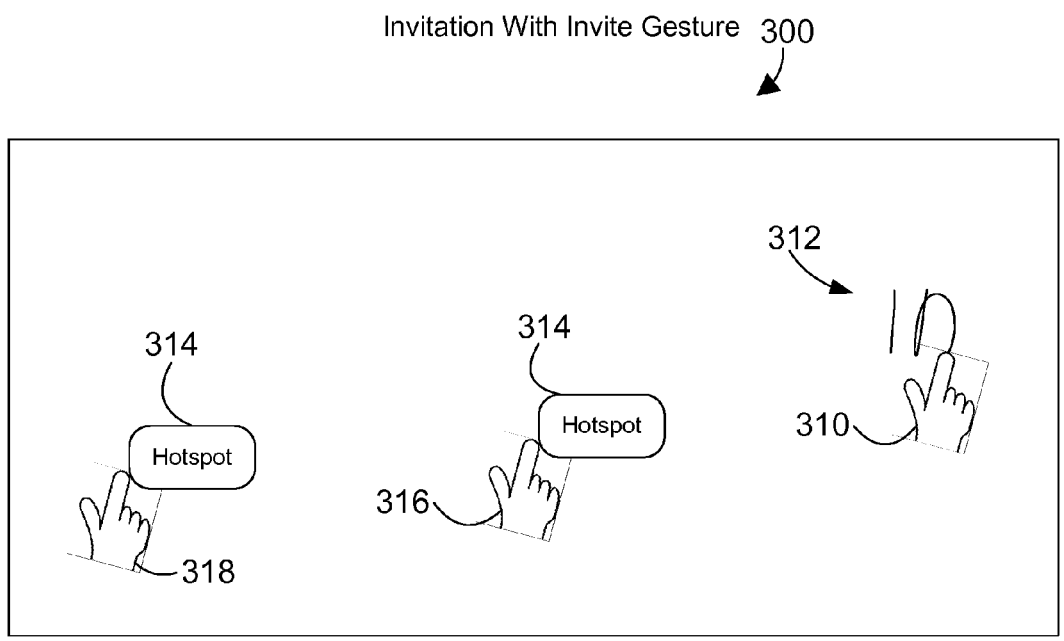
FIG. 3A illustrates initiating a MMG session with multiple users on a multi-touch display where a user inviting other uses to participate with an invitation gesture.
Figure 3B:
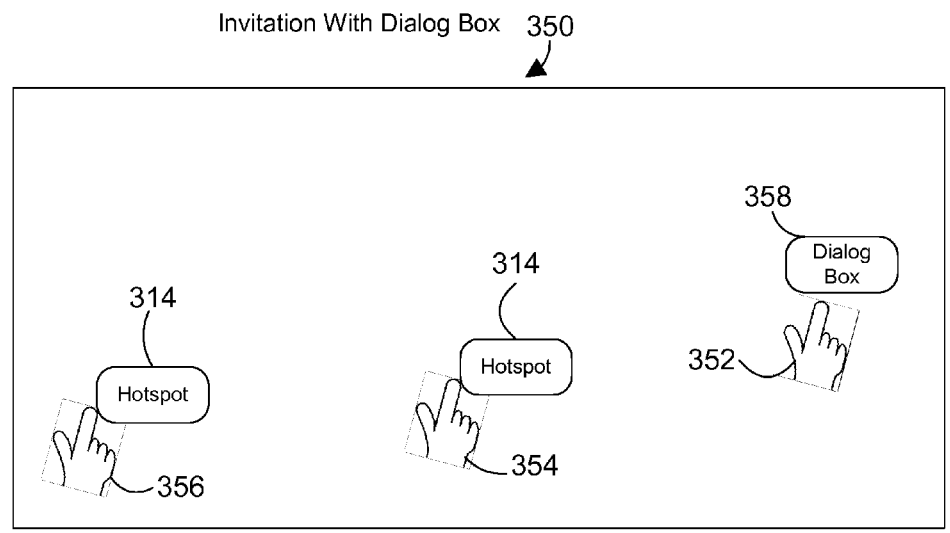
FIG. 3B illustrates initiating a MMG session with multiple users on a multi-touch display where a user inviting other uses to participate with a dialog box.
Figure 4A:
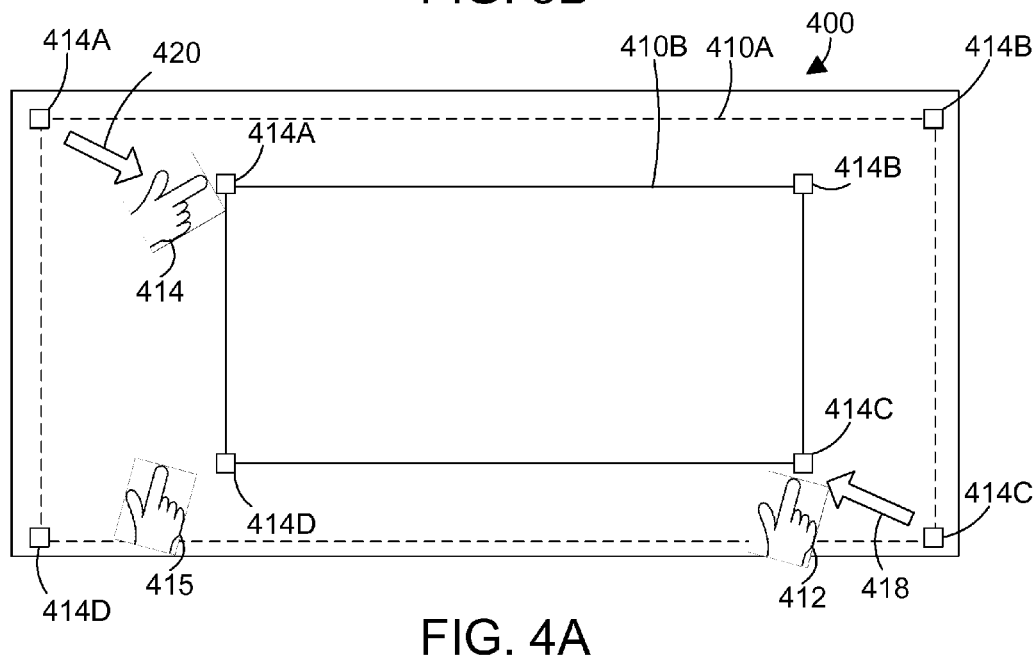
FIG. 4A illustrates an example of multiple users participating together in a multi-touch, multi-user gesture (MMG)
Figure 4B:
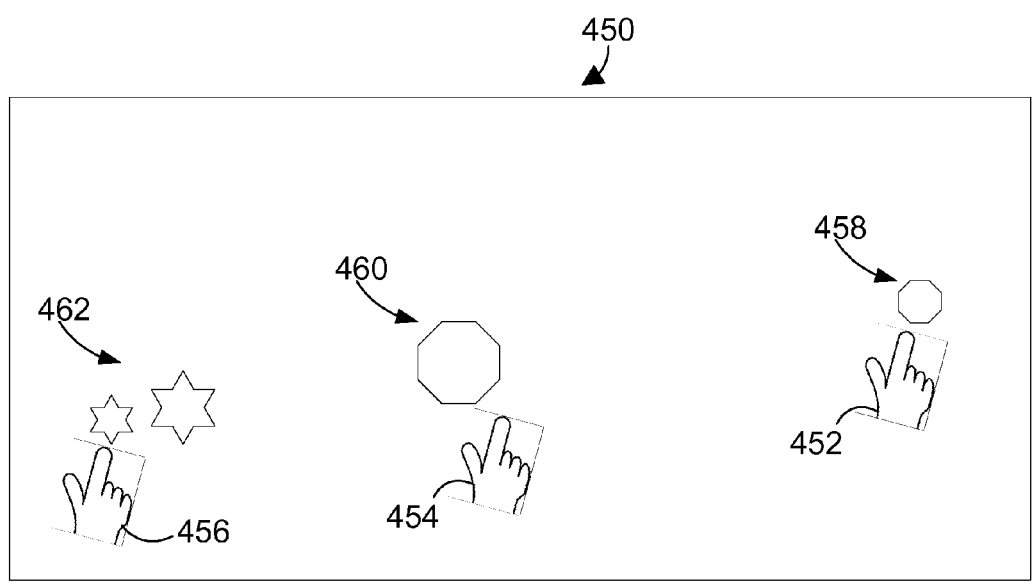
FIG. 4B illustrates another example of multiple users participating together in a multi-touch, multi-user gesture (MMG)

The multi-touch, multi-user gesture controller aggregates gestures from multiple users of a large multi-touch display to allow the users to coordinate and participate together in a multi-touch, multi-user gesture (MMG). First, the MMG controller allows one or more users to initiate a MMG session, where an MMG session is where the MMG controller supports multiple users to input a MMG. The MMG controller then determines the users that will participate in the MMG session. The MMG controller then aggregates input gestures of multiple users of a multi-touch, multi-user display or touch screen to create a MMG to perform a coordinated operation on the multi-touch display. The first step of allowing users to initiate a MMG session can be done in several ways. A first exemplary method involves the users performing a synchronized gesture as illustrated in FIG. 2 and described below. Second and third exemplary methods involve one of the users initiating a MMG session and inviting other users to join as shown in FIG. 3A and FIG. 3B and described in paragraphs below. After establishing a MMG session, the MMG controller aggregates input gestures of multiple users to perform an operation on the multi-touch display as illustrated in FIG. 4A and FIG. 4B.

FIG. 2 illustrates a multi-touch display 200 with two users initiating a MMG session using a synchronize gesture. The multi-touch display 200 is an example of a touch display 165 shown in FIG. 1. In this first method the users perform a synchronize gesture within a predefined time limit. In the illustrated examples herein, users are indicated by an illustration of a hand. In the example shown in FIG. 2, a first user 210 and a second user 212 each perform a synchronized predefined gesture 214 to initiate the MMG session. In this example the predefined gesture is an "S" shape. Any other suitable shape could also be defined and used. Prior to making the gesture 214, the users may verbally agree to start the MMG session and then make the "S" shaped gesture within a predefined time period. The predefined time period could be 1 to 5 seconds for example. The MMG controller detects the synchronize gestures by the users 210, 212 and synchronizes subsequent gestures by these two users to perform a MMG as described further below. At any time a user can end the session by performing another predefined gesture. For example, another "S" shape or an "X" shape could be used to exit the session.

FIG. 3A illustrates initiating a MMG session with multiple users on a multi-touch display where a first user invites other uses to participate with an invitation gesture. The multi-touch display 300 is an example of a touch display 165 shown in FIG. 1. In the example shown in FIG. 3A, a first user, user1 310, performs a predefined invitation gesture 314, which in this example is the letters "IN" to initiate the MMG session. The gesture may also be done with cursive letters to simplify the input to a single gesture (not shown). The MMG controller detects the predefined invitation gesture 312 by user1 310 and then displays a hotspot 314 by all other users 316, 318 of the multi-touch display 300. The hotspots 314 allow the other users that want to participate to opt in to the session. As used herein, a hotspot 314 is any suitable display item such as an icon, graphic or text that the MMG controller uses to give information to the users and that the user can use for input. In this example, the hotspot 314 is selected by a user to opt in to the session by pressing or selecting the button corresponding to the hotspot 314. The MMG controller detects the selection by the users 316, 318 to determine which users will be participating in the MMG session, and then synchronizes subsequent gestures by all participating users to perform a MMG as described below. The MMG controller may change the Hotspot graphic to indicate that the user has been opted into the MMG session. The MMG controller may also allow the users to exit the MMG session by again selecting the same or a different hotspot graphic.

FIG. 3B illustrates initiating a MMG session with multiple users on a multi-touch display 350 in a manner similar to FIG. 3A. In the example in FIG. 3B a first user 352 invites other uses 354, 356 to participate with a dialog box 358. The MMG controller detects the first user 352 using the dialog box 358 to initiate the MMG session then displays a hotspot 314 by all other users 354, 356 of the multi-touch display 350. The hotspots 314 may include instructions to help the other users determine why and how to join the session. The hotspots 314 allow the other users that want to participate to opt into the session. The hotspots 314 may be any suitable display icon, graphic or text that the users can select to opt in to the session. The MMG controller detects the selection by the users 316, 318 to determine which users will be participating in the MMG session, and then synchronizes subsequent gestures by all three users to perform a MMG as described below. The dialog box displayed by the MMG controller is preferably a simple input box for the user to enter a command. The command can be verbal, textual or a touch gesture. The user can open the dialog box in the same manner or by any other input means.

FIG. 4A illustrates an example of multiple users participating together in a MMG. In this example, the MMG demonstrated is cropping a large photo or graphic 410A on the display 400. In the Example described here it is assumed that user1 412 and user2 414 have already initiated a MMG session. A third user 415 is shown that is not participating in the session and any editing or gestures by this user is not recognized by the MMG controller as part of the MMG. The users may have initiated a MMG session using one of the methods illustrated above with reference to FIG. 2, FIG. 3A or FIG. 3B. The graphic 410A in on display 400 is shown after user1 412 has selected a lower right bounds of the graphic 410A and user2 414 has selected an upper right bounds of the graphic 410. The MMG controller recognizes the selection of the graphic 410A and then adds cropping handles 414A-414D to the graphic 410A. (Alternatively, the MMG controller could recognize a single user selecting the graphic 410.) The users can then participate in a MMG to modify the bounds of the graphic 410A by moving the crop handles 414A-414D. In this example, user1 selects the bottom right crop handle 414C and moves it to a new position as illustrated by the arrow 418. Similarly, user2 selects the top left crop handle 414A and moves it to a new position as illustrated by the arrow 420. The MMG controller uses this coordinated effort of the two users to crop the graphic 410A to appear as shown by the graphic 410B with the solid lines. The MMG controller may support a user being able to pass their gesture on to the next user as the image gets smaller by letting the next user take the cropping handle.

An alternative to the example of FIG. 4A to resize or crop an image could be accomplished by multiple users in a coordinated "pinch" gesture. In this example, the MMG controller supports a user to select a resize graphic mode and initiate a MMG session. Each user can resize the image selected by the first user with a pinch gesture similar to that done in the prior art. The coordinating effort is that the users can work together to resize the image. For example, users closer to the center of the object would have a multiplier effect where their gesture would resize the image with a smaller movement while a user toward the exterior could fine tune the resize with a larger gesture due to the smaller multiplier.

FIG. 4B illustrates another example of multiple users participating together in a multi-touch, multi-user gesture (MMG). In this example, the MMG is a gesture for multiple users to select objects to form a single group on the display 450. In the example described here it is assumed that the users have already initiated a MMG session. The users may have initiated a MMG session using one of the methods illustrated above with reference to FIG. 2, FIG. 3A or FIG. 3B. After initiating a MMG session, user1 452 selects a first object 458. User2 454 selects a related second object 460 and user3 456 selects a third set of objects 462. The selection may be indicated by highlighting the selected objects in an appropriate manner. The MMG controller recognizes the selection of the objects as the users participate in the MMG to add related objects. The MMG controller uses this coordinated effort of the three users to add all the selected objects into a group. The MMG controller may optionally use a hotspot or graphic to inform the other users of the objects selected. A user may then perform some function on the group of objects as known in the prior art. The users may exit the MMG by selecting a hotspot or performing a gesture. A practical application of this could be multiple users working together to analyze an image such as a satellite image to find areas of interest for further inspection.

Figure 5:
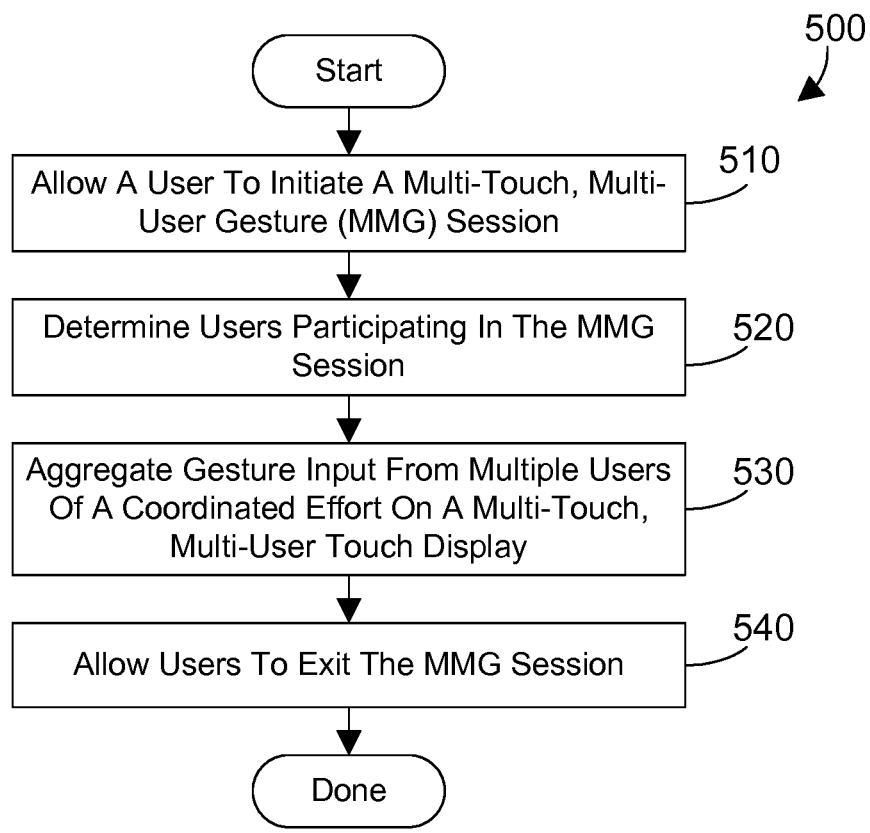
FIG. 5 is a flow diagram for a method for coordinating gestures from multiple users of a large multi-touch display.

FIG. 5 is a flow diagram for a method 500 for coordinating actions from multiple users of a large multi-touch display using MMGs. Method 500 is preferably performed by the MMG controller 124 in the operating system 121 shown in FIG. 1. Method 500 starts by allowing a user to initiate a MMG session (step 510). Then determine users participating in the MMG session (step 520). Next, aggregate gesture input from multiple users of a coordinated effort on a multi-touch, multi-user touch display (step 530). Allow users to exit the MMG session (step 540). The method is then done.

Figure 6:
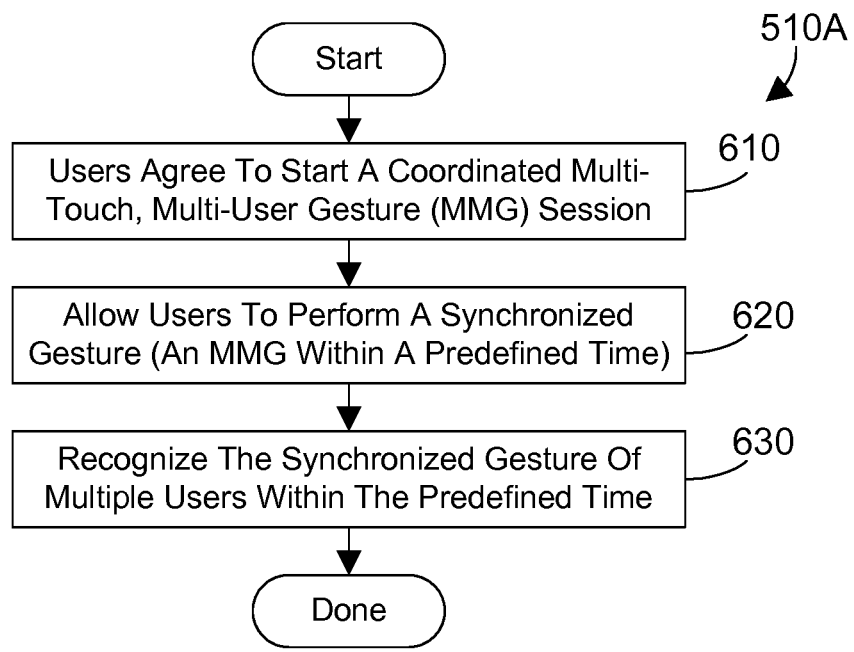
FIG. 6 is a flow diagram of a first method for initiating a MMG session.

FIG. 6 is a flow diagram of a first method 510A for initiating a MMG session. Method 510A is preferably performed by the MMG controller 124 in the operating system 121 shown in FIG. 1. Method 510A is an example of step 510 in method 500 for allowing a user to initiate a MMG session. Method 510A starts by allowing two or more users to agree, verbally or otherwise, to initiate a MMG session (step 610). Allow the users to perform a synchronized gesture (a MMG within a predefined time) (step 620). Next, recognize the synchronized gesture of the multiple users within the predefined time period to initiate the MMG session with the users that performed the synchronized gesture (step 630). The method is then done.

Figure 7:
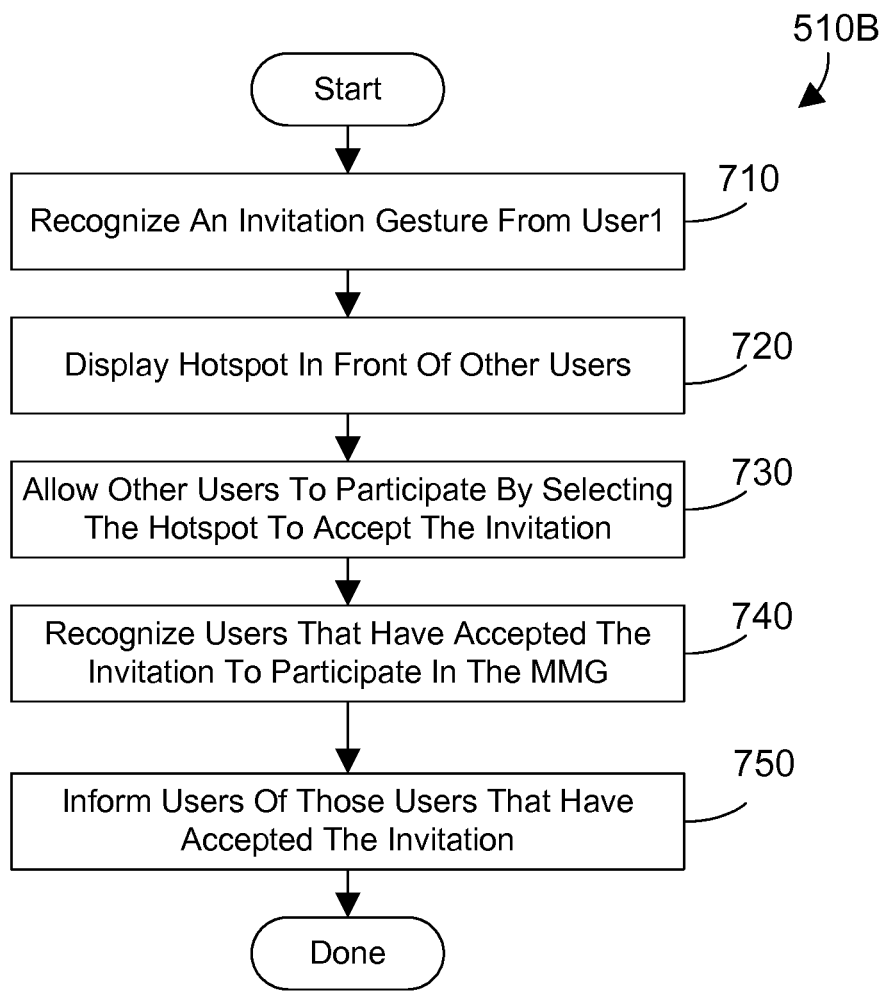
FIG. 7 is a flow diagram of a second method for initiating a MMG session.

FIG. 7 is a flow diagram of a second method 510B for initiating a MMG session. Method 510B is preferably performed by the MMG controller 124 in the operating system 121 shown in FIG. 1. Method 510B is another example of step 510 in method 500 for allowing a user to initiate a MMG session. Method 510B starts by recognizing an invitation gesture from user1 (step 710). Display an invite hotspot in front of all users (step 720). Allow other users to participate by selecting the hotspot to accept the invitation to participate (step 730). Recognize users that have accepted the invitation to participate in the MMG (step 740). Next, inform users of those other users that have accepted the invitation (step 750). The method is then done.

Figure 8:
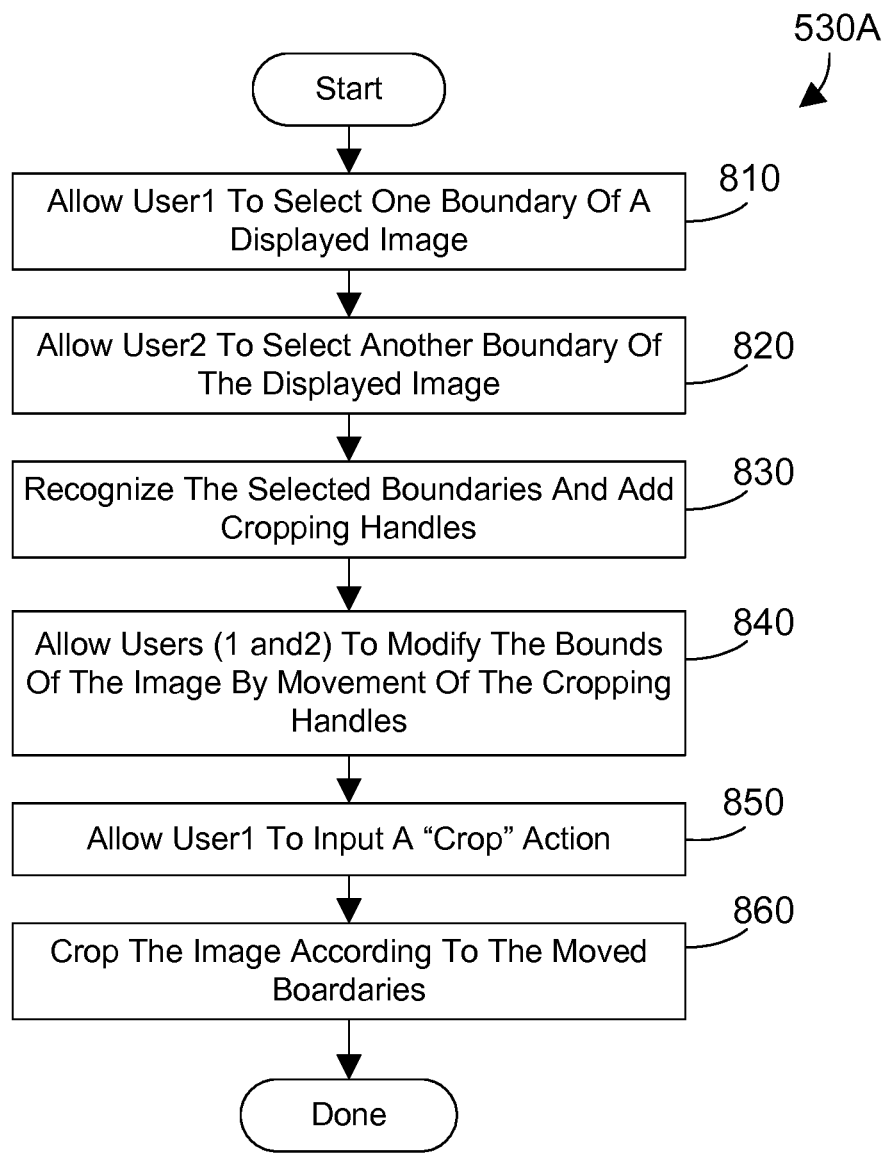
FIG. 8 is a flow diagram of a first method for aggregating input from multiple users to participate together in a MMG.

FIG. 8 is a flow diagram of a first method 530A for aggregating input from multiple users to participate together in a MMG. Method 530A is preferably performed by the MMG controller 124 in the operating system 121 shown in FIG. 1. Method 530A is an example of step 530 in method 500. Method 530A first allows user1 to select one boundary of a displayed image (step 810). Allow user2 to select another boundary of a displayed image (step 820). Then recognize the selected boundaries and add cropping handles (step 830). Allow the users to modify the bounds of the image by movement of the cropping handles (step 840). Allow a user to input a "crop" action (step 850). Crop the image according to the boundaries moved by the users (step 860). The method is then done.

Figure 9:
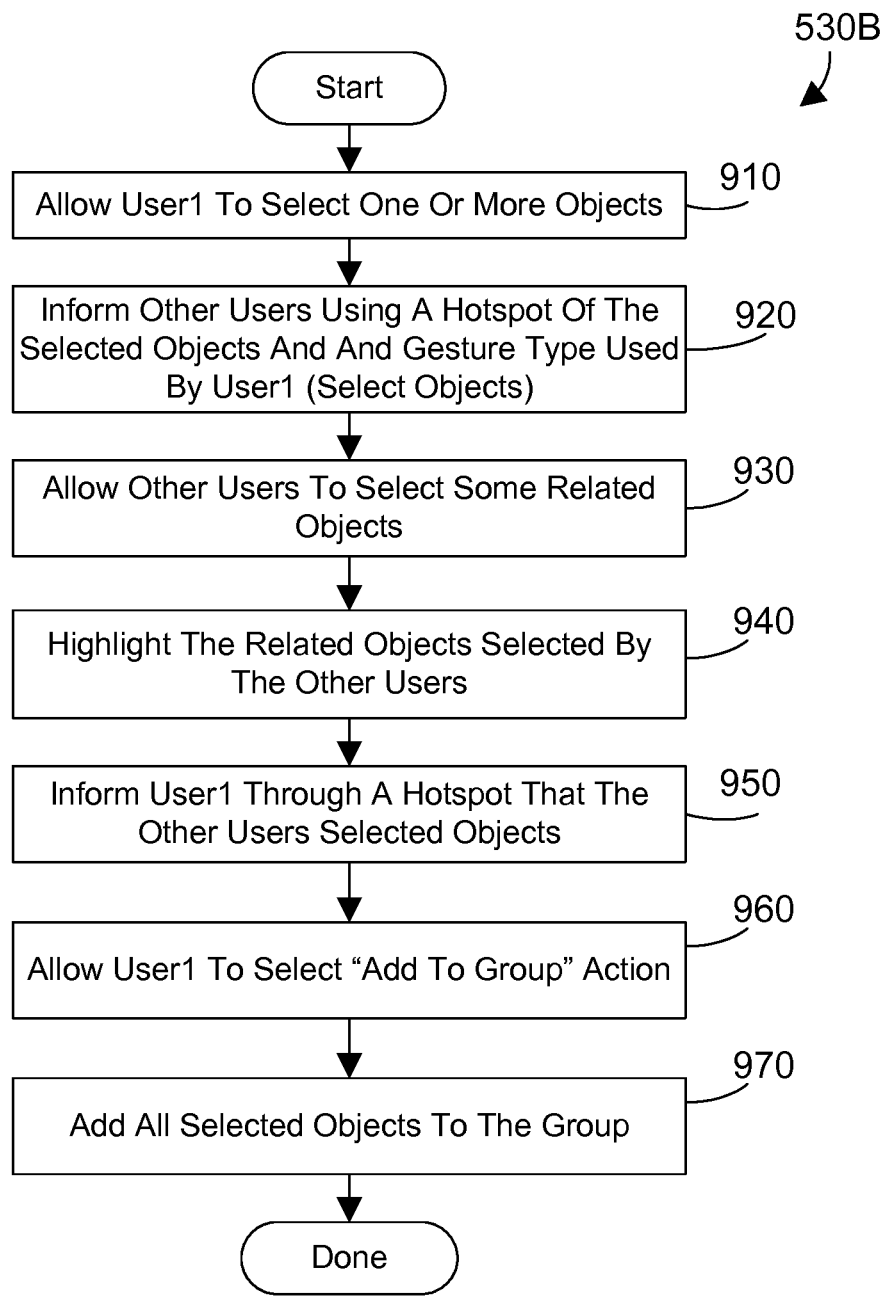
FIG. 9 is a flow diagram of a second method for aggregating input from multiple users to participate together in a MMG.

FIG. 9 is a flow diagram of a second method for aggregating input from multiple users to participate together in a MMG. Method 530B is preferably performed by the MMG controller 124 in the operating system 121 shown in FIG. 1. Method 530B is an example of step 530 in method 500. Method 530B first allows user1 to select one or more objects (step 910). Inform other users using a hotspot of the selected objects by and gesture type (select objects in this example) used by user1 (step 920). Allow other users to select some related objects (step 930). Highlight the related objects selected by the other users (step 940). Inform user1 through a hotpot that the other users have selected objects (step 950). Allow user1 to select "add to group" action (step 960). Add all selected objects by the users to the group (step 970). The method is then done.

The disclosure and claims are directed a multi-touch, multi-user gesture controller coordinates gestures from multiple users of a large multi-touch display to allow the users to participate together in a multi-touch, multi-user gesture (MMG). The MMG controller aggregates input gestures of a coordinated effort of multiple users of a multi-touch, multi-user display or touch screen to allow multiple users to collaborate on a single multi-touch display.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a multi-touch capture mechanism that obtains multi-touch data from a multi-touch display;
   a multi-touch, multi-user gesture (MMG) controller residing in the memory and executed by the at least one processor, the MMG controller allowing a user to initiate a MMG session where multiple users can participate together in a multi-touch, multi-user gesture (MMG), the MMG controller aggregating gesture input from the multi-touch capture mechanism contributed by multiple users on the multi-touch display to perform an action on elements of the multi-touch display; and
   wherein the MMG performed by the multiple users is a selection of a group of objects on the multi-touch display, the MMG controller allows a first user to select an image and make a gesture to allow other users to select related objects, the MMG controller allows the other users to select related objects and allows the first user to select an action to add the related objects to the group.

2. The apparatus of claim 1 wherein the MMG controller allows a MMG session to be initiated with a synchronized gesture by multiple users within a predefined time limit.

3. The apparatus of claim 1 wherein the MMG controller allows a MMG session to be initiated by allowing a user making an invite MMG to invite other users to participate and allowing other users to accept the invitation to participate by selecting a hotspot.

4. The apparatus of claim 3 wherein the hotspot is a display item that the MMG controller uses to give information to the users and that the user can select to supply input.

5. The apparatus of claim 4 wherein the MMG performed by the multiple users is a crop action on an image on the multi-touch display, the MMG controller allows at least one of the users to select the image and adds cropping handles to the image, the MMG controller allows the multiple users to modify the bounds of the image by moving the crop handles and crops the image according to the moved boundaries.

6. The apparatus of claim 1 wherein the multi-touch capture mechanism and the MMG controller are part of an operating system that allow an application program to utilize the multi-touch, multi-user gesture on the multi-touch display.

7. A computer-implemented method executed by at least one processor to aggregate a multi-touch, multi-user gesture (MMG) on a multi-touch display, the method comprising the steps of:
   allowing a user to initiate a MMG session;
   determining users participating in the MMG session;
   aggregating gesture input from multiple users of a coordinated effort on a multi-touch multi-user display;
   allowing users to exit the MMG session;
   wherein the step of aggregating gesture input from multiple users of a coordinated effort on a multi-touch multi-user display further comprises:
      allowing a first user to select a first object;
      informing other users using a hotspot of the selected first object type and gesture type used by the first user;
      allowing the other users to select related objects;
      highlighting the related objects selected by the other users;
      informing the first user that the other users selected objects;
      allowing the first user to select an action to add the selected objects to a group including the first object; and
      adding all the selected objects to the group.

8. The method of claim 7 wherein the step of allowing a user to initiate a MMG session comprises:
   users agreeing to start a coordinated MMG session;
   allowing the users to perform a synchronized gesture within a predefined time period; and
   recognizing the synchronized gesture of the multiple users within the predefined time period to initiate the MMG session.

9. The method of claim 7 wherein the step of allowing a user to initiate a MMG session comprises:
   recognizing an invitation gesture from a first user;
   displaying a hotspot in from of other users that are potential collaborators;
   allowing the other users to participate by selecting the hotspot to accept the invitation;
   recognizing those users that have accepted the invitation; and
   informing the first user and other users those users that have accepted the invitation.

10. The method of claim 7 wherein the step of aggregating gesture input from multiple users of a coordinated effort on a multi-touch multi-user display further comprises:
   allowing a first user to select a first boundary of a displayed image;
   allowing a second user to select a second boundary of the displayed image;
   recognizing the selected boundaries and adding cropping handles to the boundaries;
   allowing the first user and second user to modify the bounds of the image by movement of the cropping handles;
   allowing the first user to input a crop action; and
   cropping the image according to the moved boundaries.

11. The method of claim 7 wherein the hotspot is a display item that the MMG controller uses to give information to the users and that the user can select to supply input.

12. An article of manufacture comprising software stored on a non-transitory computer readable storage medium, the software when executed by a computer processor provides:
   a multi-touch, multi-user gesture (MMG) controller allowing a user to initiate a MMG session where multiple users can participate together in a multi-touch, multi-user gesture (MMG), the MMG controller aggregating gesture input from the multi-touch capture mechanism contributed by multiple users on the multi-touch display to perform an action on elements of the multi-touch display; and
   wherein the MMG performed by the multiple users is a selection of a group of objects on the multi-touch display, the MMG controller allows a first user to select an image and make a gesture to allow other users to select related objects, the MMG controller allows the other users to select related objects and allows the first user to select an action to add the related objects to the group.

13. The article of manufacture of claim 12 wherein the MMG controller allows a MMG session to be initiated with a synchronized gesture by multiple users within a predefined time limit.

14. The article of manufacture of claim 12 wherein the MMG controller allows a MMG session to be initiated by allowing a user making an invite MMG to invite other users to participate and allowing other users to accept the invitation to participate by selecting a hotspot.

15. The article of manufacture of claim 12 wherein the hotspot is a display item that the MMG controller uses to give information to the users and that the user can select to supply input.

16. The article of manufacture of claim 12 wherein the MMG performed by the multiple users is a crop action on an image on the multi-touch display, the MMG controller allows at least one of the users to select the image and adds cropping handles to the image, the MMG controller allows the multiple users to modify the bounds of the image by moving the crop handles and crops the image according to the moved boundaries.

17. The article of manufacture of claim 12 wherein MMG controller is part of an operating system that allow an application program to utilize the multi-touch, multi-user gesture on the multi-touch display.

\* \* \* \* \*